US009438016B1

United States Patent
Campos

(10) Patent No.: US 9,438,016 B1
(45) Date of Patent: Sep. 6, 2016

(54) WIRING CONDUIT

(71) Applicant: The Boeing Company, Chicago, IL (US)

(72) Inventor: Alfredo Z. Campos, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 539 days.

(21) Appl. No.: 13/904,423

(22) Filed: May 29, 2013

(51) Int. Cl.
*B60L 1/00* (2006.01)
*B60L 3/00* (2006.01)
*H02G 3/00* (2006.01)
*H02G 3/04* (2006.01)
*H02G 1/00* (2006.01)

(52) U.S. Cl.
CPC .............. *H02G 3/0406* (2013.01); *H02G 1/00* (2013.01)

(58) Field of Classification Search
None
See application file for complete search history.

(56) References Cited

U.S. PATENT DOCUMENTS

| 7,249,735 B2 | 7/2007 | Amorosi |
| 7,287,987 B2 | 10/2007 | Heisen et al. |
| 2010/0073899 A1* | 3/2010 | Davison .............. F24F 13/0209 361/825 |
| 2012/0032027 A1* | 2/2012 | Gehm .................... B64D 11/00 244/118.5 |
| 2015/0001338 A1* | 1/2015 | Siegel ...................... H02J 4/00 244/58 |

* cited by examiner

*Primary Examiner* — Carlos Amaya
*Assistant Examiner* — Aqeel Bukhari
(74) *Attorney, Agent, or Firm* — Toler Law Group, PC

(57) ABSTRACT

In one embodiment a wiring conduit comprises a body having a length extending along a longitudinal axis, the body comprising a plurality of interconnected sections defined by cutouts which extend through a portion of the body, wherein at least a portion of the body is removed along the longitudinal axis to define an opening extending along the length of the body. Other embodiments may be described.

20 Claims, 4 Drawing Sheets

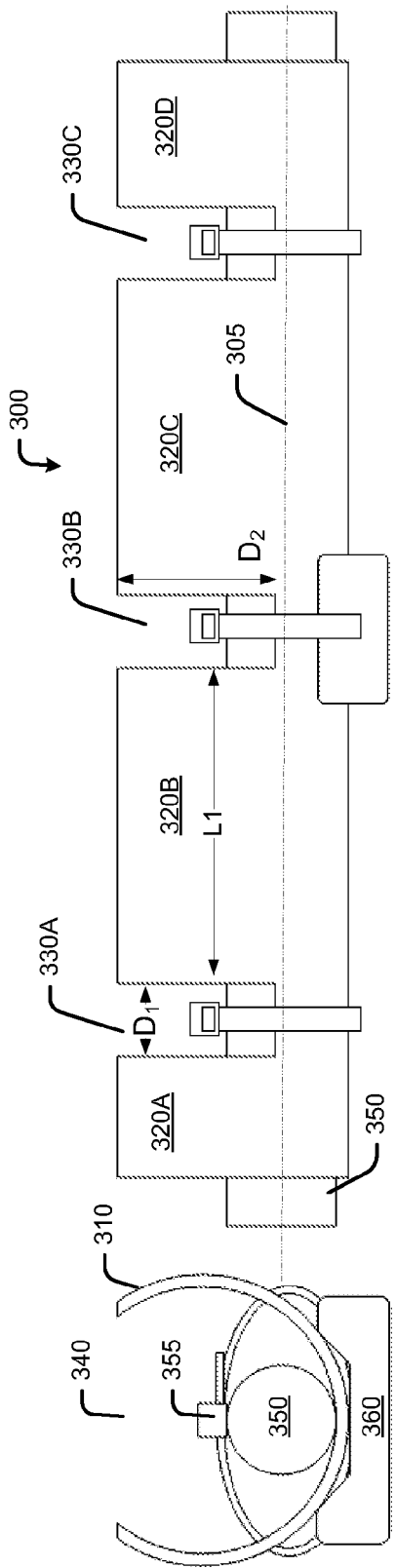
FIG. 3A
FIG. 3B
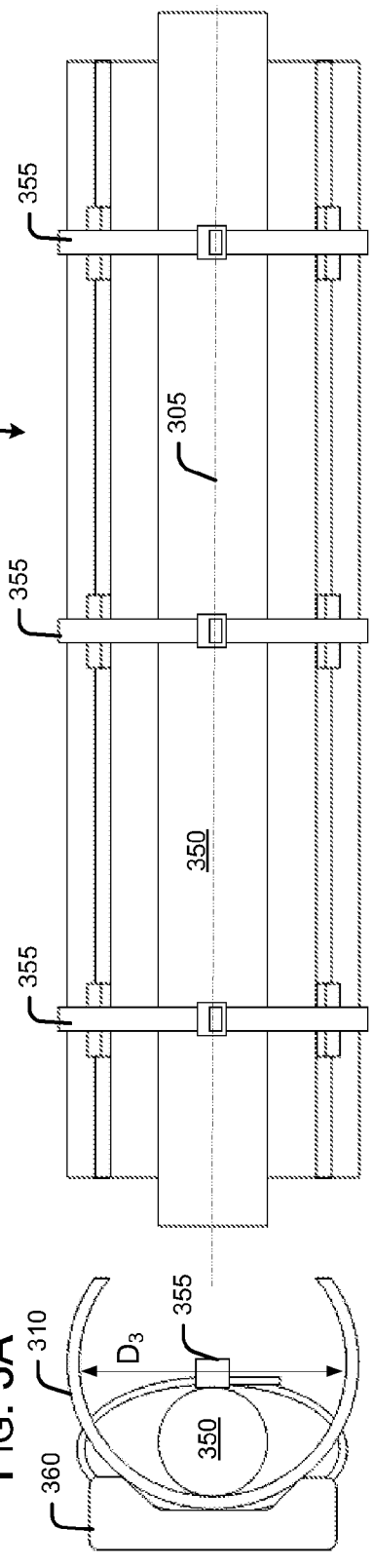
FIG. 3C
FIG. 3D

WIRING CONDUIT

RELATED APPLICATIONS

None.

BACKGROUND

The subject matter described herein relates to manufacturing techniques and more particularly to a wiring conduit.

Various manufacturing and construction operations require wiring to be installed in conduits. By way of example, in the field of aircraft manufacturing electrical conduits are secured to various structural elements throughout the aircraft and in conventional practice electrical wiring harnesses are pulled through the conduits. Aircraft structures have a wide variety of shapes and dimensions into which electrical conduit must be integrated, which sometimes requires custom conduit designs.

Accordingly, adaptable electrical conduits may find utility, e.g., in the construction of vehicles such as aircraft.

SUMMARY

In one example, a wiring conduit comprises a body having a length extending along a longitudinal axis, the body comprising a plurality of interconnected sections defined by cutouts which extend through a portion of the body, wherein at least a portion of the body is removed along the longitudinal axis to define an opening extending along the length of the body.

In another example, a method to install a wiring harness in a structure comprises securing a wiring conduit to a structure, wherein the wiring conduit comprises a body having a length extending along a longitudinal axis, the body comprising a plurality of interconnected sections defined by cutouts which extend through a portion of the body, wherein at least a portion of the body is removed along the longitudinal axis to define an opening extending along the length of the body, positioning at least one wiring harness in the body, and securing the at least one wiring harness n the body.

In another example, a vehicle comprises a structure and a wiring conduit secured to a portion of the structure and comprising a body having a length extending along a longitudinal axis, the body comprising a plurality of interconnected sections defined by cutouts which extend through a portion of the body, wherein at least a portion of the body is removed along the longitudinal axis to define an opening extending along the length of the body.

BRIEF DESCRIPTION OF THE DRAWINGS

Embodiments of methods and systems in accordance with the teachings of the present disclosure are described in detail below with reference to the following drawings.

FIG. 3A is an end view of a wiring conduit, according to embodiments.

FIG. 3B is a side view of a wiring conduit, according to embodiments.

FIG. 3C is an end view of a wiring conduit, according to embodiments.

FIG. 3D is a plan view of a wiring conduit, according to embodiments.

DETAILED DESCRIPTION

In the following description, numerous specific details are set forth to provide a thorough understanding of various embodiments. However, it will be understood by those skilled in the art that the various embodiments may be practiced without the specific details. In other instances, well-known methods, procedures, components, and circuits have not been illustrated or described in detail so as not to obscure the particular embodiments.

Electrical conduits which may be secured to structures, e.g., vehicles such as aircraft, are described herein. In some embodiments electrical conduits described herein may be used in the manufacture of composite structures for use in vehicles such as aircraft, ships, automobiles, or any other structures in which electrical lines are installed. By way of example, aircraft structures commonly include electrical conduits which are secured to structural components of the aircraft. Embodiments of conduits described herein allow provide for flexible electrical conduits which may be secured to a underlying structures that are straight or curved, and which allow electrical wires or harnesses to be installed in the conduit after the conduit is secured to the structure, thereby increasing the efficiency of the manufacturing process.

In some embodiments an electrical conduit is formed from a body in the shape of an elongated tube having a length which extends along a central longitudinal axis. At least a portion of the length of the elongated tube is removed to provide an opening through which one or more electrical wires may be inserted. The electrical conduit may be formed in a plurality of sections which are separated by cutouts. The cutouts extend radially through a sufficient portion of the body to allow the body to be deformed in regions proximate the cutouts such that the conduit may be secured to curved surfaces underlying the conduit. Electrical wiring may be secured in the body of the conduit after the conduit is secured to the structure.

Figure 1:
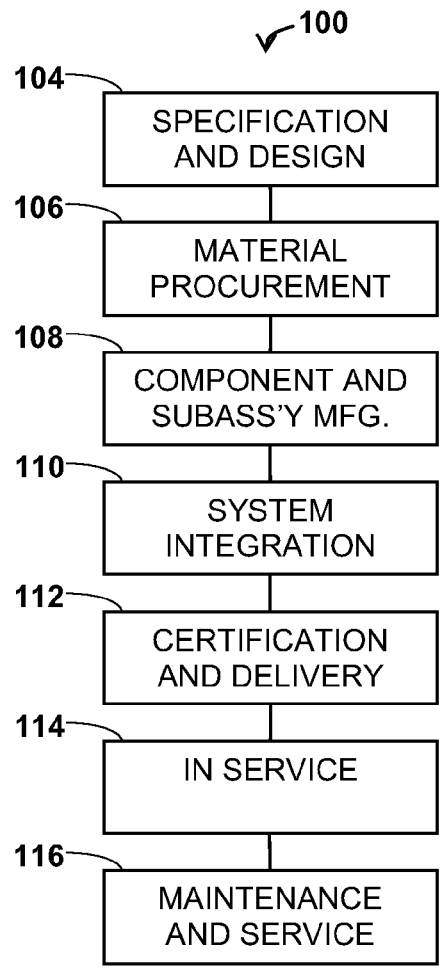
FIG. 1 is a flow diagram of aircraft production and service methodology, according to embodiments.
Figure 2:
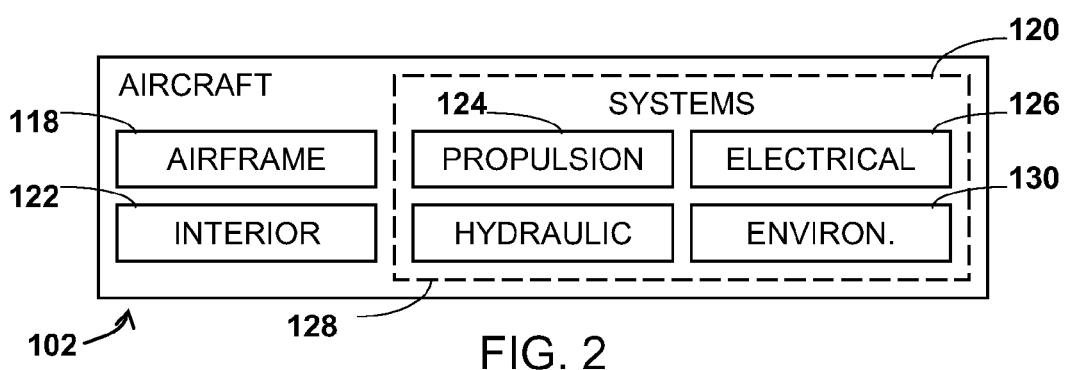
FIG. 2 is a block diagram of an aircraft, according to embodiments.

Referring more particularly to the drawings, embodiments of the disclosure may be described in the context of an aircraft manufacturing and service method 100 as shown in FIG. 1 and an aircraft 102 as shown in FIG. 2. During pre-production, exemplary method 100 may include specification and design 104 of the aircraft 102 and material procurement 106. During production, component and subassembly manufacturing 108 and system integration 110 of the aircraft 102 takes place. Thereafter, the aircraft 102 may go through certification and delivery 112 in order to be placed in service 114. While in service by a customer, the aircraft 102 is scheduled for routine maintenance and service 116 (which may also include modification, reconfiguration, refurbishment, and so on).

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on. As shown in FIG. 2, the aircraft 102 produced by exemplary method 100 may include an airframe 118 with a plurality of systems 120 and an interior 122. Examples of high-level systems 120 include one or more of a propulsion system 124, an electrical system 126, a hydraulic system 126, and an environmental system 130. Any number of other systems may be included. Although an aerospace example is shown, the principles of the invention may be applied to other industries, such as the automotive industry.

Apparatus and methods embodied herein may be employed during any one or more of the stages of the production and service method 100. For example, components or subassemblies corresponding to production process 108 may be fabricated or manufactured in a manner similar to components or subassemblies produced while the aircraft 102 is in service. Also, one or more apparatus embodiments, method embodiments, or a combination thereof may be utilized during the production stages 108 and 110, for example, by substantially expediting assembly of or reducing the cost of an aircraft 102. Similarly, one or more of apparatus embodiments, method embodiments, or a combination thereof may be utilized while the aircraft 102 is in service, for example and without limitation, to maintenance and service 116.

FIGS. 3A-3D are schematic illustrations of a wiring conduit, according to embodiments. Referring to FIGS. 3A-3D, in some embodiments, a wiring conduit 300 comprises a body 310 having a length extending along a longitudinal axis 305. The length of the body 310 may be determined by the specific application for the body. By way of example, in some embodiments the conduit 300 may be distributed in pre-cut lengths that measure between five feet and ten feet. The specific length is not critical.

In some embodiments the body 310 comprises a plurality of interconnected sections 320A, 320B, 320C, 320D, which may be referred to herein collectively by reference numeral 320. The sections 320 may be defined by cutouts 330A, 330B, 330c, which may be referred to collectively herein by reference numeral 330. The cutouts 330 extend through a portion of the body 310 to define the respective sections 320. The cutouts 330 may be characterized by a width which is designated by distance $D_1$ in FIG. 3B and a depth which is designated by distance $D_2$ in FIG. 3B. In some embodiments the body is formed from a material which is deformable under stress, e.g., a polymer or metal, and the width $D_1$ and depth $D_2$ may be selected to enable the body 310 to be secured to a curved surface. By way of example, in some embodiments the cutouts 330 may have a width $D_1$ that extends between 0.2 inches and 0.4 inches and a depth $D_2$ which measures at least 70% of the diameter of the body 310. In some embodiments the sections 320 may have a length L1 which measures between 6 inches and 10 inches. The sections 320 and cutouts 330 may be uniform in dimensions or may be variable.

As best illustrated in FIGS. 3A and 3C, in some embodiments the body 310 is arcuate in shape when viewed in a cross-section perpendicular to the longitudinal axis 305. The specific dimensions of the body 310 are not critical. The body 310 may be dimensioned to fit within a specific space. By way of example, in some embodiments the body 310 defines an arc which measures between 270 degrees and 300 degrees has a cross-sectional diameter designated by a distance $D_3$ which measures between 0.25 inches and 1.5 inches. At least a portion of the body 310 is removed along the longitudinal axis to define an opening 340 extending along the length of the body 310.

Figure 4:
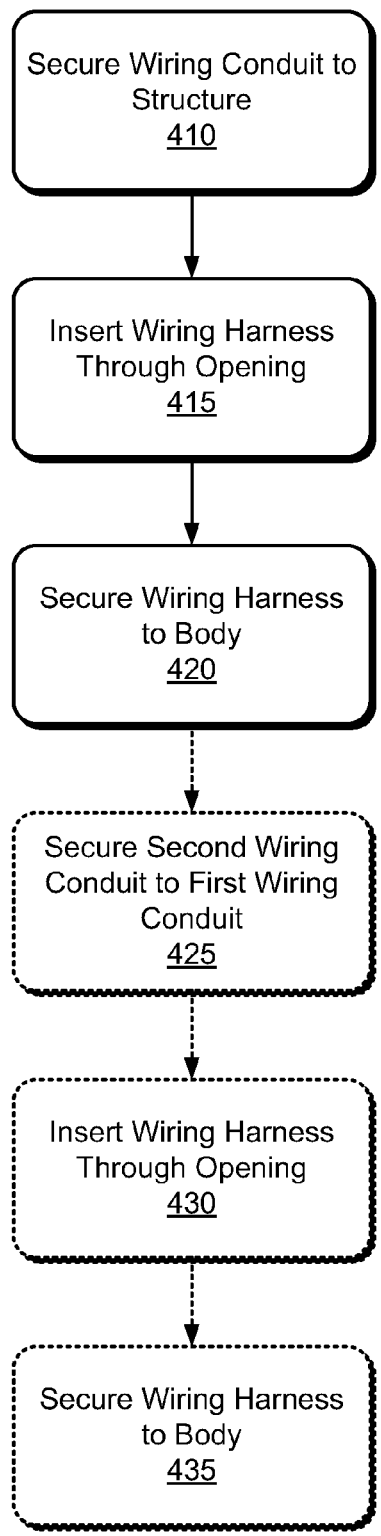
FIG. 4 is a flowchart illustrating operations in a method to install a wiring harness in a structure, according to embodiments.

FIG. 4 is a flowchart illustrating operations in a method to install a wiring harness in a structure, according to embodiments. Referring to FIG. 4, at operation 410 a wiring conduit 300 is secured to an underlying structure. By way of example, in some embodiments the body 310 of the conduit 300 may be secured to a structure 360 using conventional fasteners such as rivets, screws, or straps. In some embodiments the structure 360 may be a structural component of a vehicle such as an aircraft, a land-based vehicle or a water-based vehicle. In other examples the structure 360 may be in intermediate structure which may be secured to an underlying structural component. The structure 360 may be straight or may be curved.

At operation 415 one or more wiring harnesses may be inserted into the body 310 of the conduit 300 through the opening 340 in the body 310. In some examples the body 310 may be formed from a flexible polymeric material such that the opening 340 is closed when the body 310 is in a relaxed state. In such embodiments an installer may need to flex the arcuate body 310 to insert a wiring harness 350 into the body 300.

At operation 420 the wiring harness 350 may be secured to the body 310 using a suitable fastener. In some embodiments the wiring harness 350 may be secured by threading one or more tie straps 355 through the cutouts 330, as illustrated in FIGS. 3A-3D.

In some embodiments two or more wiring conduits may be positioned adjacent one another, and the second wiring conduit may be secured to the first wiring conduit. Such embodiments are illustrate in optional operations 425-435. At operation 425 a second wiring conduit 300 is secured to a first wiring conduit, e.g., using fasteners such as tie straps 355. At operation 430 one or more wiring harnesses 350 may be inserted into the body 310 of the second wiring conduit 300, and at operation 435 the one or more wiring harnesses 350 may be secured to the body 310 of the second wiring conduit 300.

Figure 5:
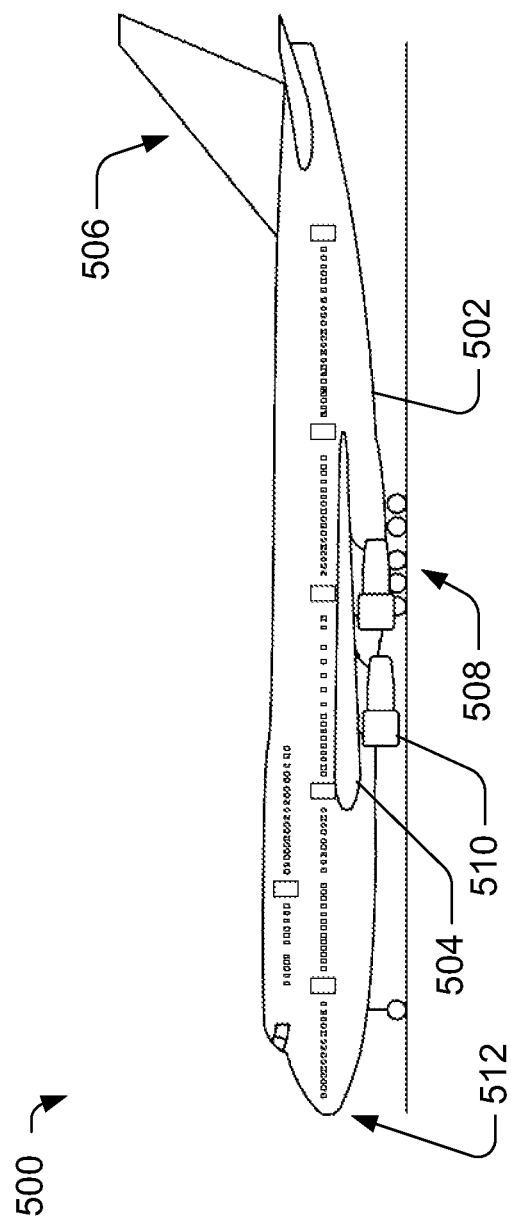
FIG. 5 is a schematic illustration of an aircraft, according to embodiments.

FIG. 5 is a side elevational view of an aircraft 500 which may include a wiring conduit as described herein. In this embodiment, the aircraft 500 includes a fuselage 502 including wing assemblies 504, a tail assembly 506, and a landing assembly 508. The aircraft 500 further includes one or more propulsion units 510, a control system 512 (not visible), and a host of other systems and subsystems that enable proper operation of the aircraft 500. In general, the various components and subsystems of the aircraft 500 may be of known construction and, for the sake of brevity, will not be described in detail herein.

Although the aircraft 500 shown in FIG. 5 is generally representative of a commercial passenger aircraft, including, for example, the 737, 747, 757, 767, 777, and 787 models commercially available from The Boeing Company of Chicago, Ill., the inventive apparatus and methods disclosed herein may also be employed in the assembly of virtually any other types of aircraft. More specifically, the teachings of the present disclosure may be applied to the manufacture and assembly of other passenger aircraft, fighter aircraft, cargo aircraft, rotary aircraft, and any other types of manned or unmanned aircraft, including those described, for example, in The Illustrated Encyclopedia of Military Aircraft by Enzo Angelucci, published by Book Sales Publishers, September 2001, and in Jane's All the World's Aircraft published by Jane's Information Group of Coulsdon, Surrey, United Kingdom, which texts are incorporated herein by reference.

In the description and claims, the terms coupled and connected, along with their derivatives, may be used. In particular embodiments, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

Reference in the specification to "one embodiment" or "some embodiments" means that a particular feature, structure, or characteristic described in connection with the embodiment is included in at least an implementation. The appearances of the phrase "in one embodiment" in various places in the specification may or may not be all referring to the same embodiment.

Although embodiments have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A wiring conduit, comprising:
a body having a length extending along a first axis, wherein the body has a first cross-sectional shape in a first plane perpendicular to the first axis, wherein the body has a second cross-sectional shape in a second plane parallel to the first plane, wherein the body has a third cross-sectional shape in a third plane parallel to the first plane, wherein the second plane is between the first plane and the third plane, wherein the first cross-sectional shape includes a first arcuate shape with a first arc length, wherein the second cross-sectional shape includes a second arcuate shape with a second arc length, wherein the third cross-sectional shape includes a third arcuate shape with a third arc length, and wherein the second arc length is less than the first arc length and less than the third arc length to define cutouts in the body.

2. The wiring conduit of claim 1, wherein the first arcuate shape defines a first arc that measures a first number of degrees, and wherein the third arcuate shape defines a second arc that measures the first number of degrees.

3. The wiring conduit of claim 2, wherein the second arcuate shape defines a third arc that measures a second number of degrees, and wherein the first number of degrees is greater than the second number of degrees.

4. The wiring conduit of claim 1, wherein the body comprises a flexible polymeric material.

5. The wiring conduit of claim 1, wherein the first arc length is equal to the third arc length.

6. The wiring conduit of claim of claim 1, wherein the first arcuate shape and the second arcuate shape are semicircular.

7. The wiring conduit of claim 6, wherein the third arcuate shape is semicircular.

8. The wiring conduit of claim 1, wherein the body has a fourth cross-sectional shape in a fourth plane parallel to the first plane, wherein the third plane is between the second plane and the fourth plane, wherein the fourth cross-sectional shape includes a fourth arcuate shape with a fourth arc length, and wherein the third arc length is greater than the fourth arc length.

9. The wiring conduit of claim 8, wherein the fourth arc length is equal to the second arc length.

10. The wiring conduit of claim 8, wherein the body has a fifth cross-sectional shape in a fifth plane parallel to the first plane, wherein the fourth plane is between the third plane and the fifth plane, wherein the fifth cross-sectional shape includes a fifth arcuate shape with a fifth arc length, and wherein the fifth arc length is greater than the fourth arc length.

11. A method comprising:
securing a wiring conduit to a structure, wherein the wiring conduit comprises a body having a length extending along a first axis, wherein the body has a first cross-sectional shape in a first plane perpendicular to the first axis, wherein the body has a second cross-sectional shape in a second plane parallel to the first plane, wherein the body has a third cross-sectional shape in a third plane parallel to the first plane, wherein the second plane is between the first plane and the third plane, wherein the first cross-sectional shape includes a first arcuate shape with a first arc length, wherein the second cross-sectional shape includes a second arcuate shape with a second arc length, wherein the third cross-sectional shape includes a third arcuate shape with a third arc length, and wherein the second arc length is less than the first arc length and less than the third arc length to define cutouts in the body;
positioning a wiring harness in the body; and
securing the wiring harness to the body.

12. The method of claim 11, wherein securing the wiring harness comprises securing the wiring harness with a fastener.

13. The method of claim 12, wherein the fastener is secured to the body at the cutouts in the body.

14. The method of claim 13, wherein the fastener is a tie strap.

15. A vehicle, comprising:
a structure; and
a wiring conduit secured to a portion of the structure, the wiring conduit comprising:
a body having a length extending along a first axis, wherein the body has a first cross-sectional shape in a first plane perpendicular to the first axis, wherein the body has a second cross-sectional shape in a second plane parallel to the first plane, wherein the body has a third cross-sectional shape in a third plane parallel to the first plane, wherein the second plane is between the first plane and the third plane, wherein the first cross-sectional shape includes a first arcuate shape with a first arc length, wherein the second cross-sectional shape includes a second arcuate shape with a second arc length, wherein the third cross-sectional shape includes a third arcuate shape with a third arc length, and wherein the second arc length is less than the first arc length and less than the third arc length to define cutouts in the body.

16. The vehicle of claim 15, wherein the first arcuate shape defines a first arc that measures a first number of degrees, and wherein the third arcuate shape defines a second arc that measures the first number of degrees.

17. The vehicle of claim 16, wherein the second arcuate shape defines a third arc that measures a second number of degrees, and wherein the first number of degrees is greater than the second number of degrees.

18. The vehicle of claim 15, wherein the first arcuate shape has a first diameter, and wherein the second arcuate shape has the first diameter.

19. The vehicle of claim 15, further comprising a wiring harness secured to the body by a fastener, wherein portions of the fastener are positioned in the cutouts.

20. The vehicle of claim 19, wherein the fastener comprises a tie strap.

* * * * *